Nov. 29, 1927.
L. ROUANET
1,650,854
PROCESS OF MANUFACTURING CAGES FOR BALL OR ROLLER BEARINGS
Filed Nov. 14, 1924
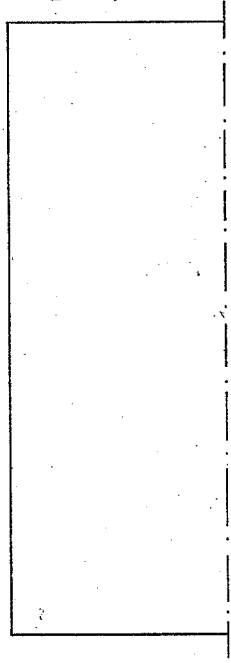
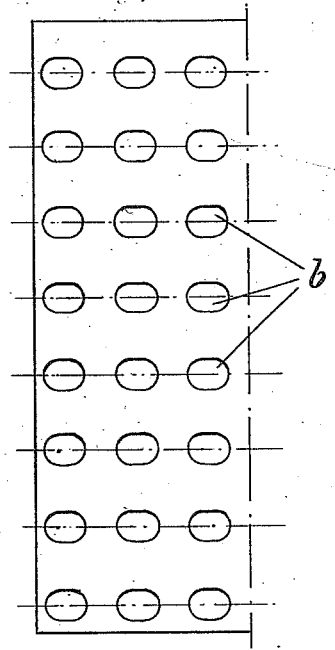
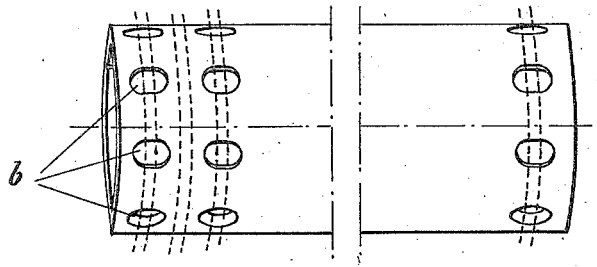
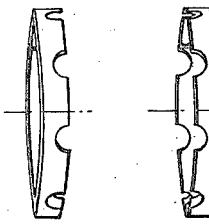
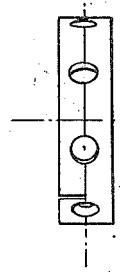
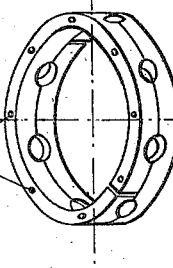

Patented Nov. 29, 1927.

1,650,854

UNITED STATES PATENT OFFICE.

LOUIS ROUANET, OF IVRY-PORT, FRANCE, ASSIGNOR TO COMPAGNIE D'APPLICATIONS MECANIQUES, OF IVRY-PORT, FRANCE, A FRENCH COMPANY.

PROCESS OF MANUFACTURING CAGES FOR BALL OR ROLLER BEARINGS.

Application filed November 14, 1924, Serial No. 749,988, and in France November 24, 1923.

The present invention relates to a manufacturing process of guide members for the balls, rollers and the like.

The main object of the invention is to provide a manufacturing process enabling guide members to be economically obtained from the triple point of view of material, labor and tools.

To this effect sheets of suitable material and width are provided with series or sets of aligned holes and rolled up in tubular form. Sections or rings are taken from the said tubes, said sections or rings having each time one of their circular side faces provided with radially extending notches or housings for the balls, rollers and the like.

By way of example, the annexed drawing shows the successive steps of manufacturing a ball cage according to the process of the invention.

In the drawing:

Fig. 1 is a plan view of a sheet portion of suitable material for forming guide members according to the invention;

Fig. 2 is a similar view of the sheet portion provided with aligned holes.

Fig. 3 is a side view of the rolled up cylinder;

Fig. 4 is a front elevation of two cut rings, as obtained from the rolled up cylinder of Figure 3.

Fig. 5 shows these rings coupled together with the joint of each ring, and the notches, in proper relative position;

Fig. 6 is a perspective view of a cage, provided with lateral holes.

Plane sheets (Fig. 1), of appropriate section, and of a width equal or practically equal to the developed length of the cage to be formed, and for example of brass, iron or steel etc., are punched with series or sets of aligned holes $b$ (Fig. 2), such holes being of oblong form in the example considered. The sheets thus punched are rolled up and expanded into cylindrical bodies or tubes as seen in Fig. 3. By cutting the tubes so formed, along the dotted lines of Fig. 3, rings are obtained, the edges of which are flat and provided with semicircular notches, respectively.

These rings, coupled together by their notched edges adjacent, and the notches opposite each other (Fig. 5), are maintained in such position for the boring of lateral holes $a$ (Fig. 6), said holes being used for the final assembly of the two rings or conjugate halves constituting the cage.

It will be understood that the joint between the ends of the sheet forming each of the tubes may be welded before cutting the rings without departing from the scope of the invention.

I claim:

1. A process of manufacturing guide members for the balls, rollers and the like in ball or roller bearings which consists in cutting sheets of suitable raw material to a width approximately equal to the circumferential length of the desired guide members; punching in the said sheets series or sets of aligned holes; rolling up and expanding the sheets in the form of tubes, cutting the tubes along parallel lines passing through the holes and between the series of holes, in order to form guide and spacing rings for the balls, rollers and the like.

2. A manufacturing process according to claim 1 characterized by the fact that the rings obtained from the formed tubes are coupled together by pairs in order to form cages for balls, rollers and the like.

LOUIS ROUANET.